United States Patent
Chiu et al.

(10) Patent No.: US 8,184,693 B2
(45) Date of Patent: May 22, 2012

(54) ADAPTIVE FILTERING FOR BIT-DEPTH SCALABLE VIDEO CODEC

(75) Inventors: Yi-Jen Chiu, San Jose, CA (US); Lidong Xu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1074 days.

(21) Appl. No.: 12/082,561

(22) Filed: Apr. 11, 2008

(65) Prior Publication Data

US 2009/0257486 A1     Oct. 15, 2009

(51) Int. Cl.
    *H04N 7/12*     (2006.01)
(52) U.S. Cl. .................................. 375/240.02
(58) Field of Classification Search ............ 375/240.02, 375/240.12, 240.13, 240.16, 240.22, 240.24
See application file for complete search history.

(56) References Cited

U.S. PATENT DOCUMENTS

| | | | | |
|---|---|---|---|---|
| 2008/0247467 | A1* | 10/2008 | Rusanovskyy et al. | 375/240.16 |
| 2009/0022220 | A1* | 1/2009 | Vatis et al. | 375/240.12 |
| 2009/0097558 | A1* | 4/2009 | Ye et al. | 375/240.13 |
| 2009/0097561 | A1* | 4/2009 | Chiu et al. | 375/240.16 |
| 2010/0208809 | A1* | 8/2010 | Yin et al. | 375/240.12 |
| 2010/0220795 | A1* | 9/2010 | Yin et al. | 375/240.29 |

FOREIGN PATENT DOCUMENTS

EP     1 841 230     10/2007

OTHER PUBLICATIONS

Liu et al, Bit-depth Scalable Coding for High Dynamic Range Video, Mitsubishi Electric Research Laboratories, downloadable at http://www.merl.com, 12 pages, Apr. 2008.*

European Patent Office, Examination Report for EP Application No. 09251080.9, dated Jul. 13, 2010, 8 pgs.

Yu Y et al: "Bit depth"26. JVT Meeting; 83. MPEG Meeting; Jan. 13-18, 2008; Antalya, ; (Joint Video Team of ISO/IEC JTC1/SC29IWG11 and ITU-T SG.16) No. JVT-Z045, Jan. 22, 2008, XP030007334.

Winken M et al: "CE2: SVC bit-depth scalability"24. JVT Meeting; 81. MPEG Meeting; Jun. 29-Jul. 5, 2007; Geneva, CH; (Joint Video Team of ISO/IEC JTC1/SC29IWG11 and ITU-T SG.16 ) Jul. 4, 2007, XP030007164.

M. Winken, H. Schwarz, D. Marpe, and T. Wiegand, "SVC bit depth scalability," ISO/IEC JTC1/SC29/WG11 and ITU-T SG16 Q.6, Document JVT-V078, Jan. 2007.

A. Segall and Y. Su, "System for bit-depth scalable coding," ISO/IEC JTC1/SC29/WG11 and ITU-T SG16 Q.6, Document JVT-W113, Apr. 2007.

S. Liu, W. Kim and A. Vetro, "Inter-layer prediction for bit-depth scalability," ISO/IEC JTC1/SC29/WG11 and ITU-T SG16 Q.6, Document JVT-X075, Jul. 2007.

Y. Gao and Y. Wu, "Applications and requirement for color bit depth scalability," ISO/IEC JTC1/SC29/WG11 and ITU-T SG16 Q.6, Document JVT-U049, Oct. 2006.

Y. Yu, S. Gordon, and M. Yang, "Improving Compression Preformance in Bit Depth SVC with a Prediction Filter", JVT document JVT-Z045, Joint Video Team (JVT) of ISO/IEC JTC1/SC29/WG11 & ITU-T SG16 Q.6, Antalya, Turkey, Jan. 2008.

Y. Vatis, B. Edler, I. Wassermann, D. T. Nguyen and J. Ostermann, "Coding of Coefficients of two-dimensional non-separable Adaptive Interpolation Filter", Visual Communications and Image Processing (VCIP), Beijing, China, Jul. 2005.

* cited by examiner

*Primary Examiner* — Frank Duong
(74) *Attorney, Agent, or Firm* — Trop, Pruner & Hu, P.C.

(57) ABSTRACT

Adaptive filtering may be used to increase the quality of tone mapped, baseline layer encoded information. As a result, scalable video codecs may be implemented with improved picture quality in some embodiments.

30 Claims, 4 Drawing Sheets

ADAPTIVE FILTERING FOR BIT-DEPTH SCALABLE VIDEO CODEC

BACKGROUND

This relates generally to scalable video codecs.

Scalable video codecs enable different picture quality levels to be delivered to different customers, depending on what type of service they prefer. Lower quality video services may be less expensive than higher quality video services.

In a scalable video coder, a lower bit depth may be called a baseline layer and a higher bit depth may be called an enhancement layer. The greater the bit depth, the better the quality of the video.

In a scalable video codec, an encoder and decoder may be provided as one unit. In some cases, only an encoder may be provided and, in other cases, only a decoder may be provided. The scalable video coder enables the system to operate with at least the baseline layer. Thus, in low cost systems, only the baseline layer may be utilized and, in higher cost, more advanced systems, the enhancement layer may be utilized.

It is advantageous to derive the enhancement layer from the baseline layer. To this end, inverse tone mapping may be utilized to increase the bit depth of the baseline layer to the bit depth of the enhancement layer. In some cases, for example, the baseline layer may be 8 bits per pixel and the enhancement may be 10, 12, or higher bits per pixel.

DETAILED DESCRIPTION

Figure 1:
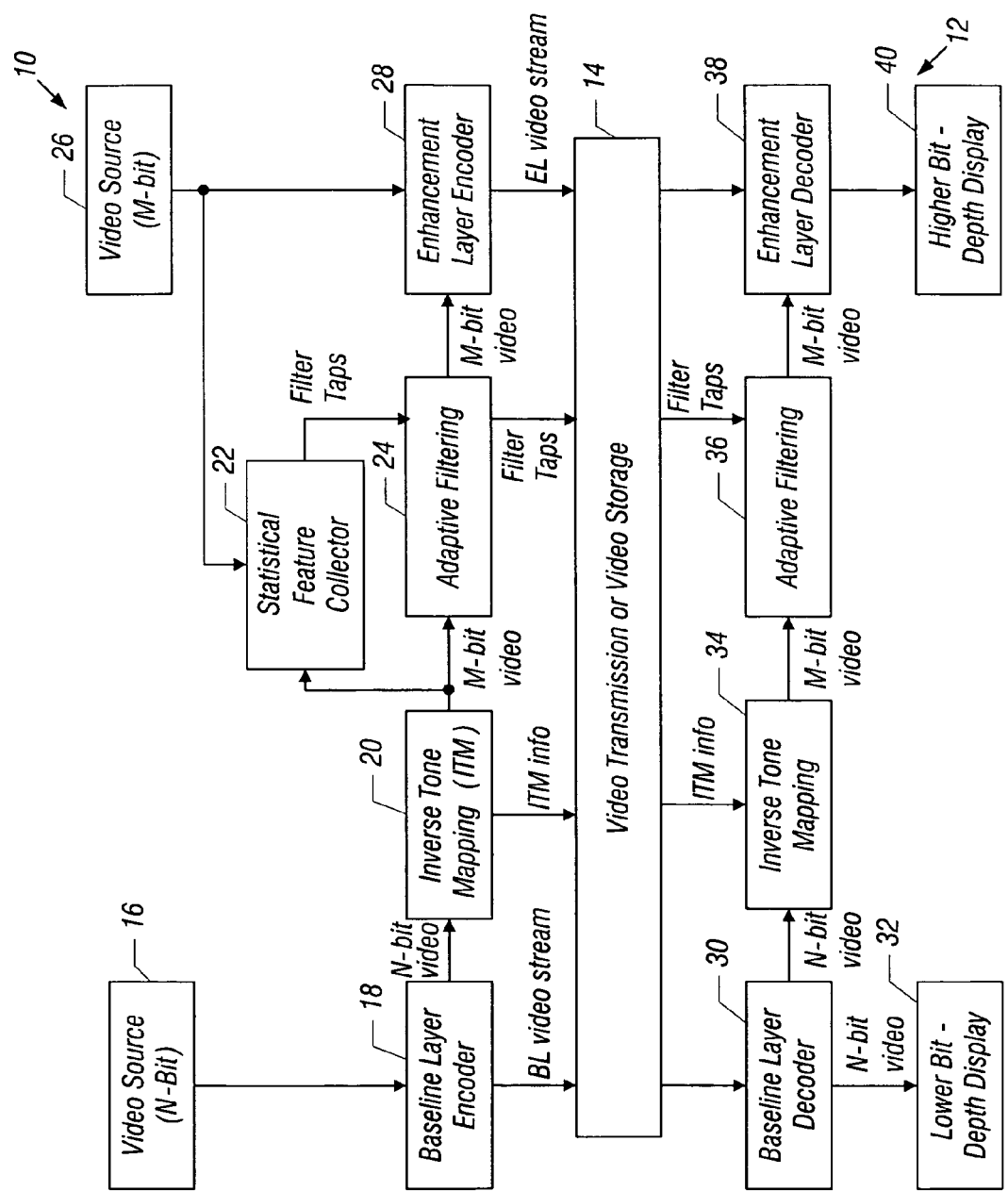
FIG. 1 is a schematic depiction of an encoder and decoder system in accordance with one embodiment of the present invention.

Referring to FIG. 1, a scalable video codec includes an encoder 10 that communicates over a video transmission or a video storage 14 with a decoder 12. FIG. 1 shows an encoder from one codec with a decoder from another codec.

As an example, a network computer may communicate over the network with another computer. Each computer may have a codec which includes both an encoder and a decoder so that information may be encoded at one node, transmitted over the network to the other node, which then decodes the encoded information.

The codec shown in FIG. 1 is a scalable video codec (SVC). This means that it is capable of encoding and/or decoding information with different bit depths. Video sources 16 and 26 may be connected to the encoder 10. The video source 16 may use N-bit video data, while the video source 26 may provide M-bit video data, where the bit depth M is greater than the bit depth N. In other embodiments, more than two sources with more than two bit depths may be provided.

In each case, the information from a video source is provided to an encoder. In the case of the video source 16, of lower bit depth, the information is provided to a baseline encoder 18. In the case of the video source 26, of higher bit depth, an enhancement layer encoder 28 is utilized.

However, the baseline encoded information from the baseline encoder 18 is inverse tone mapped to increase its bit depth to M-bits for use in enhancement layer encoding. Thus, the N-bit video is provided, in one embodiment, to an inverse tone mapping unit 20. The inverse tone mapping 20 increases the bit depth and produces an M-bit output to adaptive filtering 24. The adaptive filtering 24 adaptively filters the increased bit depth video. An improved quality M-bit video output from filtering 24 is provided to the enhancement layer encoder 28.

The encoder of FIG. 1 may be consistent with the H.264 (advanced video codec (AVC) and MPEG-4 Part 10), compression standard, for example. The H.264 standard has been prepared by the Joint Video Team (JVT), which includes ITU-T SG16 Q.6, also known as VCEG (Video Coding Expert Group), and of the ISO-IEC JTC1/SC29/WG11 (2003), known as MPEG (Motion Picture Expert Group). H.264 is designed for applications in the area of digital TV broadcast, direct broadcast satellite video, digital subscriber line video, interactive storage media, multimedia messaging, digital terrestrial TV broadcast, and remote video surveillance, to mention a few examples.

While one embodiment may be consistent with H.264 video coding, the present invention is not so limited. Instead, embodiments may be used in a variety of video compression systems including MPEG-2 (ISO/IEC 13818-1 (2000) MPEG-2 available from International Organization for Standardization, Geneva, Switzerland) and VC1 (SMPTE 421M (2006) available from SMPTE White Plains, N.Y. 10601).

Adaptive filtering 24 may be achieved by a Wiener filter in one embodiment. A Wiener filter is a filter that achieves the least mean square error among the source signal and the predicted signal modeled through the random noise. "Adaptive filtering" means that filtering is content dependent or based on an analysis of pixel intensities in a portion of a picture, a picture as a whole, or a plurality of successive pictures. For example, the type of video information that is received, be it graphics or stream view video, results in different taps in the Wiener filter for different types of video. Thus, adaptive filter taps are the result of an examination of the intensity of each pixel in a given picture portion, picture, or series of pictures.

The adaptive filtering 24 receives an input from a statistical feature collector 22. The statistical feature collector 22 receives inputs from the video source 26 and inverse tone mapping 20, in one embodiment. The statistical feature collector 22 calculates the weight $c_i$, which is applied to a reconstructed mapped pixel $y_i$. The weight $c_i$ is used to calculate the filter taps for the adaptive filtering 24. The statistical feature collector 22 analyzes each pixel of an M-bit depth picture and determines how groups of pixels across a region of a picture or across multiple pictures vary in intensity to determine what type of video is being received and what adaptive filtering should be done. Based on this information, it sets the filter taps for the adaptive filtering 22.

Based on the nature of the information, it can determine how to set the taps for the adaptive filtering 24.

The encoder provides information over the video transmission or video storage 14 for use by a decoder. The information that may be provided may include the baseline (BL) layer video stream, the inverse tone mapping (ITM) information, the filter taps from the adaptive filtering 24, and the enhancement layer (EL) video stream. Some of this information may be included in a packet header. For example, the inverse tone mapping (ITM) information and the filter tap information may be provided in an appropriate header in packetized data transmission.

Upon receipt of the appropriate information in the decoder 12, the baseline decoder 30 decodes the information for N-bit video display by the display 32. However, if, instead, enhancement layer equipment is provided, a higher bit depth display 40 may be provided. (Generally, two displays would not be included). The baseline decoder output, which is N-bits, is converted to M-bit video using inverse tone mapping unit 34, which is also fed ITM information about the inverse tone mapping that was done in the encoder 10. Likewise, the adaptive filtering 36 is done, in some embodiments, by extracting information from the header about the filter taps used in the adaptive filtering 24 in the encoder 10. The adaptive filtering 36 improves the quality of the M-bit video information received from the tone mapping unit 34. The adaptive filtering 36 then provides the information to the enhancement layer decoder 38.

Figure 2:
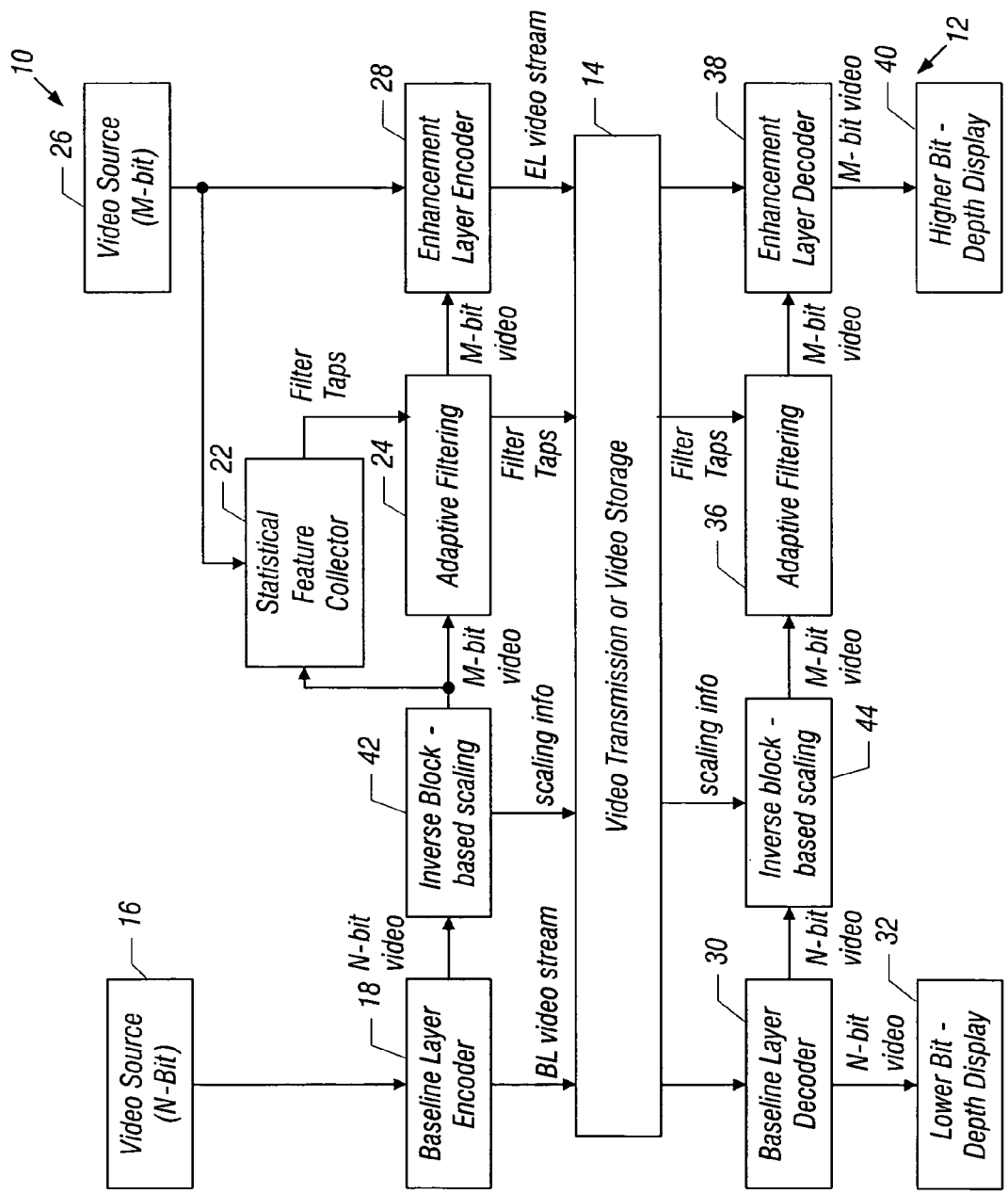
FIG. 2 is a depiction of an encoder and decoder system in accordance with another embodiment of the present invention.

FIG. 2 corresponds to FIG. 1, with the difference being that instead of using inverse tone mapping, a particular type of inverse tone mapping, called inverse block-based scaling, is accomplished in unit 42. The corresponding unit 44 is used for inverse block-based scaling in the decoder. The inverse block-based scaling unit in the decoder receives scaling information from the scaling unit 42 in the encoder. Otherwise, the operation is basically the same as that of FIG. 1.

Figure 3:
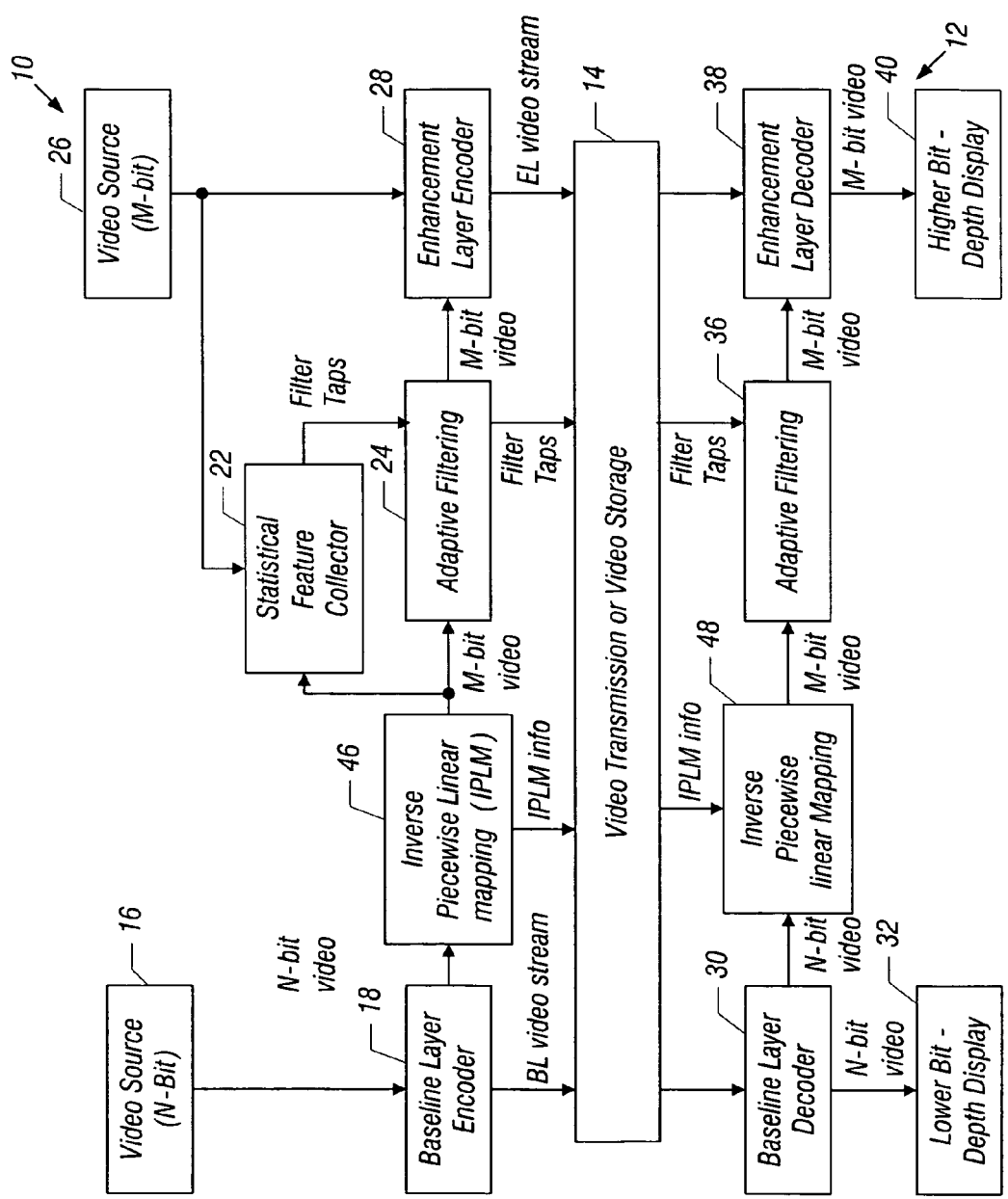
FIG. 3 is a depiction of an encoder and decoder system in accordance with still another embodiment of the present invention.

Similarly, in FIG. 3, the inverse tone mapping is done by an inverse piecewise linear mapping unit 46 which provides information through the video transmission or video storage 14 to an inverse video piecewise linear mapping unit 48 in the decoder. Otherwise, the operation is as already described.

In general, any type of tone mapping may be utilized to increase the bit density of the baseline layer video. That information is then subjected to adaptive filtering to increase its quality, before providing the information to the enhancement layer encoder.

In some embodiments, the adaptive filtering using a Wiener filter improves the quality of the enhancement layer video. The feature collector 22 may set the filter taps for adaptive filtering 24 to an error based on the difference between current and predicted pictures. The Wiener filter is a well known optimal linear filter that copes with pictures degraded by Gaussian noise, blurring, and distortion. The information about the Wiener filter taps may then be applied as global information at the picture level and this is block based free and has no serial dependency from reconstructed neighboring pixels in some embodiments.

The derivation of the filter taps by the collector 22 is as follows.

Consider the input pixel $x_k$ and the output of the Wiener filter $z_k$ consisting of the reconstructed pixel $y_i$ in the filter support $\{S\}$, sized as L+1, with the weight $c_i$. The adaptive (Wiener) filter function is $$z_k = \sum_{i \in \{S\}} y_i \cdot c_i \quad [1]$$

The residual signal C among input pixel $x_k$ and the Wiener filtered pixel $z_k$ is defined as $$error_k = z_k - x_k \quad [2]$$

The Wiener filter is optimized by minimizing the mean square error with the filter taps $\{c_i\}$ $$c_i = \arg \min E[error_k^2] \quad [3]$$

where E[ ] is the expectation of the square of the residual signal for the pixels of interest which could be the pixels from a sequence of pictures, a picture, or some region inside a picture.

$$E[error_k^2] = E[(z_k - x_k)^2] \quad [4]$$

$$= E\left[\left(\sum_{i \in \{S\}} y_i \cdot c_i\right)^2\right] + E[(x_k)^2] - 2E\left[\left(\sum_{i \in \{S\}} y_i \cdot c_i\right)(x_k)\right]$$

To find the minimum of $E[error_k^2]$, the derivative with respect to $c_i$ is taken. The filter taps may be derived by letting the derivative being equal to zero, $$\frac{\partial}{\partial c_i} E[error_k^2] = 2\left(\sum_{j \in \{S\}} E\{(y_i)(y_j)\}c_j\right) - 2E[(y_i)(x_k)] \quad [5]$$

$$= 0$$

$$i = 0, \ldots, L$$

The autocorrelation function of $\{y\}$ in Equation [6] below and the cross-correlation function among $\{y\}$ and $\{x\}$ in Equation [7] below is denoted:

$$r_{yy}(i) = E[y_k y_{k+i}] \quad [6]$$

$$r_{xy}(i) = E[x_k y_{k+i}] \quad [7]$$

Equation [5] may be rewritten in the matrix form as:

$$\begin{bmatrix} r_{yy}(0) & r_{yy}(1) & \ldots & r_{yy}(L) \\ r_{yy}(1) & r_{yy}(0) & \ldots & r_{yy}(L-1) \\ \vdots & \vdots & \ddots & \vdots \\ r_{yy}(L) & r_{yy}(L-1) & \ldots & r_{yy}(0) \end{bmatrix} \begin{bmatrix} c_0 \\ c_1 \\ \vdots \\ c_L \end{bmatrix} = \begin{bmatrix} r_{xy}(0) \\ r_{xy}(1) \\ \vdots \\ r_{xy}(L) \end{bmatrix} \quad [8]$$

Thus, the Wiener filter tap set $\{C\}$ can be derived in the matrix format as:

$$R_{yy} \cdot C = R_{xy} => C = R_{yy}^{-1} \cdot R_{xy} \quad [9]$$

where $R_{yy}^{-1}$ is the inverse matrix of the auto-correlation matrix in Equation [9].

The statistical feature selector 34 determines the weight $c_i$, using the equations [6 and 7] to fill out the matrix of equation [8] and then does the calculation of equation [9] to determine the weight $c_i$. The equation [9] is the final answer of the value $c_i$ that indicates the taps for the Wiener filter. In some embodiments, the same filter taps are used across the entire picture, but the taps may vary from frame to frame or picture to picture.

The Equations [6-7] can be expressively indexed in the two dimensional format in Equations [10-11] below for a non-separable filter with the size L+1=(2l+1)*(2l+1):

$$r_{yy}(m, n) = \sum_{j=0}^{j=height-1} \sum_{i=0}^{i=width-1} y_{i,j} \cdot y_{i+m, j+n} \quad [10]$$

$$\approx \sum_{j=1}^{j=height-l-1} \sum_{i=1}^{i=width-l-1} y_{i,j} \cdot y_{i+m, j+n}$$

-continued $$r_{xy}(m, n) = \sum_{j=0}^{j=height-1} \sum_{i=0}^{i=width-1} x_{i,j} \cdot y_{i+m,j+n} \quad [11]$$

$$\approx \sum_{j=1}^{j=height-l-1} \sum_{i=1}^{i=width-l-1} x_{i,j} \cdot y_{i+m,j+n}$$

where m, n are in the range of (−1, 1).

The collection of auto-correlation function in Equation [6] and [10] can be obtained at the video decoder side, but the cross-correlation in Equations [7] and [11] is derived at video encoder side because of the higher bit depth input data {x} is only available at video encoder side. Thus, the filter taps derived in Equation [9] are transmitted from video encoder to video decoder.

The transmitting of the cross-correlation function, instead of the derived filter taps, is sufficient in some cases because video decoder could derive the filter taps with the reception of cross-correlation function plus the decoded inverse tone mapped data {y} at its own hand.

The filter taps may also be derived per luma and per chroma channel respectively. Better coding efficiency is achieved for chroma picture based on the filter taps derived with only chroma pixel. In some scenarios, the one chroma table may be shared by both Cb and Cr channels, or two individual tables may be used for Cb and Cr respectively.

More accurate statistical information to improve coding efficiency may be achieved further by skipping the pixels close to the picture border in one embodiment. The right hand side of Equations [10-11] expresses this skipping.

The right side of equations [10 and 11] are two dimensional approximations of equations [6 and 7], excluding edge pixels near the pixel borders. This may improve picture quality because, at the picture borders, the absence of neighbors results in dimensioned value data.

Figure 4:
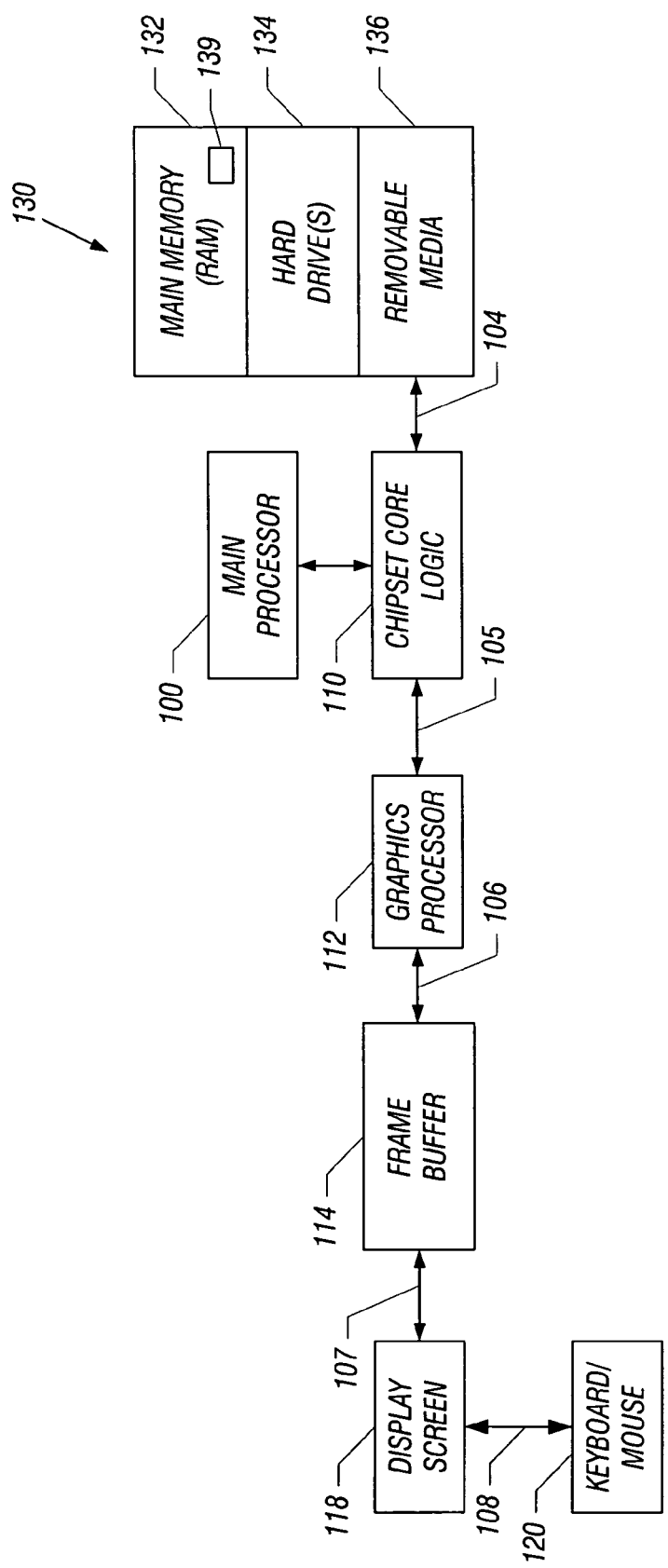
FIG. 4 is a system depiction for still another embodiment of the present invention.

Referring to FIG. 4, the encoders and decoders depicted in FIGS. 1-3 may, in one embodiment, be part of a graphics processor 112. In some embodiments, the encoders and decoders shown in FIGS. 1-3 may be implemented in hardware and, in other embodiments, they may be implemented in software or firmware. In the case of a software implementation, the pertinent code may be stored in any suitable semiconductor, magnetic or optical memory, including the main memory 132. Thus, in one embodiment, source code 139 may be stored in a machine readable medium, such as main memory 132, for execution by a processor, such as the processor 100 or the graphics processor 112.

A computer system 130 may include a hard drive 134 and a removable medium 136, coupled by a bus 104 to a chipset core logic 110. The core logic may couple to the graphics processor 112 (via bus 105) and the main processor 100 in one embodiment. The graphics processor 112 may also be coupled by a bus 106 to a frame buffer 114. The frame buffer 114 may be coupled by a bus 107 to a display screen 118, in turn coupled to conventional components by a bus 108, such as a keyboard or mouse 120.

The blocks indicated in FIGS. 1 to 3 may constitute hardware or software components. In the case of software components, the figures may indicate a sequence of instructions that may be stored in a computer readable medium such as a semiconductor integrated circuit memory, an optical storage device, or a magnetic storage device. In such case, the instructions are executable by a computer or processor-based system that retrieves the instructions from the storage and executes them. In some cases, the instructions may be firmware, which may be stored in an appropriate storage medium. One result of the execution of such instructions is the improvement of quality of pictures that are ultimately displayed on a display screen.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   increasing, using a hardware processor, the bit depth of encoded video information from a first video source;
   adaptive filtering, using the hardware processor, the increased bit depth encoded video information; and
   encoding an enhancement layer video stream from a second video source using the filtered increased bit depth video information.

2. The method of claim 1 including increasing the bit depth of the encoded video information using inverse tone mapping.

3. The method of claim 2 including increasing the bit depth using inverse block-based scaling.

4. The method of claim 2 including increasing the bit depth using inverse piecewise linear mapping.

5. The method of claim 1 including increasing the bit depth in an encoder.

6. The method of claim 1 including increasing the bit depth in a decoder.

7. The method of claim 1 including adaptive filtering using a Wiener filter.

8. The method of claim 1 including increasing the bit depth of encoded baseline layer video information.

9. The method of claim 1 including providing said filtered increased bit depth video information to enhancement layer encoder.

10. The method of claim 1 wherein adaptive filtering includes setting taps for a filter based on analysis of pixels within a picture.

11. The method of claim 10 including calculating a coefficient to correct remapped pixels based on pixel intensities in a picture.

12. The method of claim 11 including adjusting taps of a filter for adaptive filtering to minimize an error based on the difference between a current picture and a predicted picture.

13. The method of claim 1 wherein adaptive filtering includes setting cross-correlation information for a filter based on analysis of pixels among an input picture and reconstructed mapped picture.

14. An apparatus comprising:
   a device to increase a bit depth of encoded video information from a first video source;
   an adaptive filter to filter increased bit depth encoded video information; and an enhancement layer encoder to encode an enhancement layer video stream from a second video source using filtered increased bit depth video information.

15. The apparatus of claim 14 wherein said device includes an inverse tone mapping.

16. The apparatus of claim 15, said device including an inverse block-based scaling.

17. The apparatus of claim 15, said device including an inverse piecewise linear mapping.

18. The apparatus of claim 14 wherein said apparatus is an encoder.

19. The apparatus of claim 14 wherein said apparatus includes a decoder.

20. The apparatus of claim 14 wherein said filter includes a Wiener filter.

21. The apparatus of claim 14 including a baseline encoder coupled to said device.

22. The apparatus of claim 14 wherein the enhancement layer encoder is coupled to said filter.

23. The apparatus of claim 14 including a statistical feature collector to set taps for the filter based on an analysis of pixels within a picture.

24. The apparatus of claim 23, said statistical feature collector to calculate a coefficient to correct remapped pixels based on pixel intensities in a picture.

25. The apparatus of claim 24, said statistical feature collector to adjust the taps of the filter to minimize an error based on the difference between a current picture and a predicted picture.

26. The apparatus of claim 14, said filter to set the cross correlation information based on an analysis of pixels among an input picture and a reconstructed mapped picture.

27. An apparatus comprising:
a baseline layer encoder coupled to a first video source;
an inverse tone mapping coupled to said baseline layer encoder;
an adaptive filter coupled to said inverse tone mapping; and
an enhancement layer encoder coupled to said adaptive filter and to a second video source.

28. The apparatus of claim 27 wherein said inverse tone mapping is an inverse block-based scaling.

29. The apparatus of claim 27 wherein said inverse tone mapping is an inverse piecewise linear mapping.

30. The apparatus of claim 27 wherein said adaptive filter to set cross correlation information based on an analysis of pixels in an input picture and a reconstructed mapped picture.

* * * * *